(12) United States Patent
Itoh et al.

(10) Patent No.: US 9,245,568 B2
(45) Date of Patent: Jan. 26, 2016

(54) MAGNETIC DISK AND METHOD OF MANUFACTURING THE SAME

(75) Inventors: Kae Itoh, Shinjuku-ku (JP); Katsushi Hamakubo, Shinjuku-ku (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 573 days.

(21) Appl. No.: 12/744,611

(22) PCT Filed: Mar. 27, 2009

(86) PCT No.: PCT/JP2009/056256
§ 371 (c)(1),
(2), (4) Date: May 25, 2010

(87) PCT Pub. No.: WO2009/123043
PCT Pub. Date: Oct. 8, 2009

(65) Prior Publication Data
US 2010/0261039 A1 Oct. 14, 2010

(30) Foreign Application Priority Data

Mar. 30, 2008 (JP) ................................. 2008-088952

(51) Int. Cl.
| | |
|---|---|
| *G11B 5/65* | (2006.01) |
| *G11B 5/84* | (2006.01) |
| *C10M 105/54* | (2006.01) |
| *C10M 107/38* | (2006.01) |
| *G11B 5/725* | (2006.01) |

(52) U.S. Cl.
CPC ............ *G11B 5/8408* (2013.01); *C10M 105/54* (2013.01); *C10M 107/38* (2013.01); *G11B 5/725* (2013.01); *C10M 2213/043* (2013.01); *C10M 2213/06* (2013.01); *C10M 2213/0606* (2013.01); *C10N 2220/021* (2013.01); *C10N 2230/06* (2013.01); *C10N 2240/204* (2013.01)

(58) Field of Classification Search
None
See application file for complete search history.

(56) References Cited

U.S. PATENT DOCUMENTS 4,529,659 A * 7/1985 Hoshino et al. ............... 428/422
5,536,425 A * 7/1996 Kondo et al. .......... 252/62.51 R
(Continued)

FOREIGN PATENT DOCUMENTS

| JP | 62-066417 A | 3/1987 |
|---|---|---|
| JP | 63-018517 | 1/1988 |

(Continued)

OTHER PUBLICATIONS

Machine Translation of JP 2001052328 A (Shigematsu, Yasuyuki).*
(Continued)

*Primary Examiner* — Holly Rickman
*Assistant Examiner* — Linda Chau

(57) ABSTRACT

Disclosed is a magnetic disk that has excellent durability, particularly excellent LUL durability, and excellent alumina resistance and has a high level of reliability under a low flying height of a magnetic head involved in a recent tendency toward a rapid increase in recording density and a very severe environment resistance requirement due to diversified applications. A magnetic disk (10) comprises a substrate (1) and at least a magnetic layer (6), a carbon-based protective layer (7), and a lubricating layer (8) provided in that order over the substrate (1). The lubricating layer (8) contains a compound that has a perfluoropolyether main chain in the structure thereof and has an aromatic group and a polar group at the end of the molecule.

6 Claims, 1 Drawing Sheet

(56) References Cited

U.S. PATENT DOCUMENTS

| | | | |
|---|---|---|---|
| 6,083,600 A * | 7/2000 | Kasai et al. | 428/835.8 |
| 2004/0068144 A1 * | 4/2004 | Meo et al. | 564/503 |
| 2006/0052262 A1 | 3/2006 | Akada et al. | |
| 2009/0075123 A1 * | 3/2009 | Liu et al. | 428/833.3 |

FOREIGN PATENT DOCUMENTS

| | | | |
|---|---|---|---|
| JP | 7-141644 A | 6/1995 | |
| JP | 9-016956 A | 1/1997 | |
| JP | 2001-052328 A | 2/2001 | |
| JP | 2001052328 A * | 2/2001 | G11B 5/725 |
| JP | 2001-164279 A | 6/2001 | |
| JP | 2002-074648 A | 3/2002 | |
| JP | 2004-152460 | 5/2004 | |
| JP | 2007213738 A * | 8/2007 | |
| WO | 2004/031261 A1 | 4/2004 | |

OTHER PUBLICATIONS

English Machine Translation: Amo et al. (JP 2007-213738).*

* cited by examiner

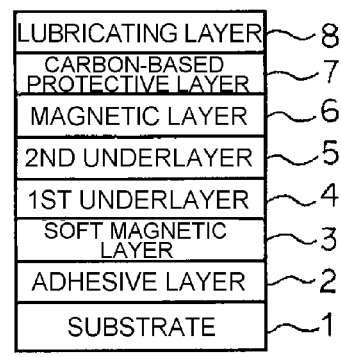

MAGNETIC DISK AND METHOD OF MANUFACTURING THE SAME

TECHNICAL FIELD

This invention relates to a magnetic disk adapted to be mounted in a magnetic disk device such as a hard disk drive (hereinafter abbreviated as a HDD).

BACKGROUND ART

Various information recording techniques have been developed following the increase in volume of information processing in recent years. Particularly, the areal recording density of HDDs using the magnetic recording technique has been increasing at an annual rate of about 100%. Recently, the information recording capacity exceeding 60 GB has been required per 2.5-inch magnetic disk adapted for use in a HDD or the like. In order to satisfy such a requirement, it is necessary to realize an information recording density exceeding 100 Gbits/inch$^2$. In order to achieve the high recording density in a magnetic disk for use in a HDD or the like, it is necessary to reduce the size of magnetic crystal grains forming a magnetic recording layer serving to record information signals, and further, to reduce the thickness of the layer. However, in the case of conventionally commercialized magnetic disks of the in-plane magnetic recording type (also called the longitudinal magnetic recording type or the horizontal magnetic recording type), as a result of the advance in size reduction of magnetic crystal grains, there has been the occurrence of a thermal fluctuation phenomenon where the thermal stability of recorded signals is degraded due to superparamagnetism so that the recorded signals are lost. This has been an impeding factor for the increase in recording density of the magnetic disks.

In order to solve this impeding factor, magnetic recording media of the perpendicular magnetic recording type have been proposed in recent years. In the case of the perpendicular magnetic recording type, as is different from the case of the in-plane magnetic recording type, the easy magnetization axis of a magnetic recording layer is adjusted so as to be oriented in a direction perpendicular to the surface of a substrate. As compared with the in-plane recording type, the perpendicular magnetic recording type can suppress the thermal fluctuation phenomenon and thus is suitable for increasing the recording density. As such a perpendicular magnetic recording medium, there is known a so-called two-layer perpendicular magnetic recording disk comprising, over a substrate, a soft magnetic underlayer made of a soft magnetic substance and a perpendicular magnetic recording layer made of a hard magnetic substance, as is described in, for example, JP-A-2002-74648.

In the meantime, a conventional magnetic disk has a protective layer and a lubricating layer on a magnetic recording layer formed over a substrate, for the purpose of ensuring the durability and reliability of the magnetic disk. Particularly, the lubricating layer used at the outermost surface is required to have various properties such as long-term stability, chemical substance resistance, friction properties, and heat resistance.

In order to satisfy such a requirement, perfluoropolyether-based lubricants having hydroxyl groups in molecules have often been used conventionally as lubricants for magnetic disks. For example, according to JP-A-Sho-62-66417 (Patent Document 1) or the like, there is well known a magnetic recording medium or the like coated with a perfluoroalkylpolyether lubricant having a structure of $HOCH_2CF_2O$ $(C_2F_4O)_p(CF_2O)_qCH_2OH$ with hydroxyl groups at both ends of a molecule. It is known that when hydroxyl groups are present in molecules of a lubricant, the adhesion properties of the lubricant to a protective layer can be obtained by the interaction between the protective layer and the hydroxyl groups.

Patent Document 1: JP-A-S62-66417

DISCLOSURE OF THE INVENTION

Problem to be Solved by the Invention

As described above, the information recording density of 100 Gbits/inch$^2$ or more has been required in recent HDDs. One reason for this is related to the fact that, in addition to the conventional need as storage devices for computers, the HDDs have been mounted in mobile phones, car navigation systems, digital cameras, and so on.

In the case of these new uses, since the housing space for mounting the HDD is extremely small as compared with that of the computer, it is necessary to miniaturize the HDD. For this, it is necessary to reduce the diameter of a magnetic disk to be mounted in the HDD. For example, a 3.5-inch or 2.5-inch magnetic disk can be used for the computer use, but in the case of the above-mentioned new uses, use is made of a small-diameter magnetic disk of, for example, 1.8 inches to 0.8 inches smaller in diameter than the magnetic disk for the computer use. It is necessary to store a certain or more information volume even when the magnetic disk is reduced in diameter as described above, thus resulting in acceleration of improvement in information recording density.

Further, in order to effectively use the limited disk area, use has been made of a HDD of the LUL (Load Unload) system instead of the conventional CSS (Contact Start and Stop) system. In the LUL system, a magnetic head is retreated to an inclined platform called a ramp located outside a magnetic disk while the HDD is stopped, then in a start-up operation, the magnetic head is caused to slide from the ramp, after the magnetic disk starts to rotate, so as to fly over the magnetic disk to perform recording/reproduction. In a stop operation, the magnetic head is retreated to the ramp outside the magnetic disk, then the rotation of the magnetic disk is stopped. This sequence of the operations is called a LUL operation. In the magnetic disk mounted in the HDD of the LUL system, it is not necessary to provide a contact sliding region (CSS region) for the magnetic head, which is required in the CSS system, thus it is possible to increase a recording/reproducing region and therefore the LUL system is preferable for increasing the information capacity.

In order to improve the information recording density under these circumstances, it is necessary to reduce a spacing loss as much as possible by reducing the flying height of the magnetic head. In order to achieve the information recording density of 100 Gbits/inch$^2$ or more, it is necessary to set the flying height of the magnetic head to 10 nm or less. In the LUL system, as is different from the CSS system, since it is not necessary to provide an uneven shape for CSS on the surface of the magnetic disk, it is possible to significantly smooth the surface of the magnetic disk. Consequently, in the case of the magnetic disk mounted in the HDD of the LUL system, the flying height of the magnetic head can be further reduced as compared with the CSS system and therefore there is also an advantage that it is possible to increase the S/N ratio of a recording signal and thus to contribute to an increase in recording capacity of the magnetic disk device.

Because of the further reduction in magnetic head flying height following the recent introduction of the LUL system, it has become necessary that the magnetic disk stably operate even in the case of the low flying height of 10 nm or less. Especially, as described above, the magnetic disks have been shifted from the in-plane magnetic recording type to the perpendicular magnetic recording type in recent years, so that an increase in capacity of the magnetic disks and a reduction in flying height following it have been strongly demanded.

Because of the further reduction in magnetic head flying height (10 nm or less) following the increase in recording density in recent years, the possibility becomes high that contact or friction between a magnetic head and the surface of a magnetic disk frequently occurs. When the magnetic head is brought in contact with the surface of the magnetic disk, it may happen that the magnetic head does not immediately go out of contact with the surface of the magnetic disk, but slides with friction for a while. A slider of a currently used magnetic head contains alumina ($Al_2O_3$). It is known that the $CF_2O$ portion of the main chain of the above-mentioned perfluoropolyether-based lubricant tends to be decomposed by a Lewis acid such as alumina. Therefore, the perfluoropolyether-based lubricant used at the surface of the magnetic disk may be decomposed at the $CF_2O$ portion of its main chain by alumina due to contact or the like with the magnetic head so that a reduction in molecular weight of the lubricant forming a lubricating layer tends to be promoted more than conventional. Thus, there is concern about the possibility that data read/write is subjected to a failure due to adhesion, to the magnetic head, of the lubricant decomposed to decrease in molecular weight. Further, in consideration of data recording/reproduction in the state where a magnetic head and a magnetic disk are in contact with each other in near future, the influence due to the constant contact is further concerned. If the molecular weight of the lubricant forming the lubricating layer is reduced, its fluidity increases so that its adhesion to a protective layer decreases. Then, it is considered that the lubricant with the increased fluidity is transferred and deposited on the magnetic head located in the extremely close positional relationship to make the flying posture thereof unstable, thus causing a fly stiction failure. Particularly, a recently introduced magnetic head with a NPAB (negative pressure) slider is considered to promote the transfer deposition phenomenon because it tends to suck the lubricant due to a strong vacuum created at the bottom surface of the magnetic head. The transferred and deposited lubricant may produce an acid such as hydrofluoric acid to thereby corrode an element portion of the magnetic head. Particularly, a magnetic head mounted with a magnetoresistive effect element tends to be corroded.

As described before, recently, magnetic disk devices have started to be often used not only as conventional storage devices of personal computers, but also as storage devices for mobile applications such as mobile phones and car navigation systems and, therefore, due to diversification of use applications, the environmental resistance required for magnetic disks has become very strict. Therefore, in view of these circumstances, it is urgently necessary, more than conventional, to further improve the durability of magnetic disks, the durability of lubricants forming lubricating layers, and so on.

Following the rapid improvement in information recording density of magnetic disks in recent years, it is required to reduce the magnetic spacing between a magnetic head and a recording layer of a magnetic disk and, therefore, it has become necessary to further reduce the thickness of a lubricating layer present between the magnetic head and the recording layer of the magnetic disk. A lubricant used as the lubricating layer at the outermost surface of the magnetic disk largely affects the durability of the magnetic disk. Even if the thickness of the lubricating layer is reduced, the stability and reliability are essential for the magnetic disk.

As described above, it is required to realize a magnetic disk excellent in long-term stability of a lubricating layer and having high reliability despite the reduction in magnetic spacing and the low flying height of a magnetic head following the increase in recording density in recent years and, further, due to diversification of use applications and so on, the environmental resistance required for magnetic disks has become very strict. Therefore, it is required, more than conventional, to further improve the properties such as the durability of lubricants, forming lubricating layers, that largely affect the durability of magnetic disks, particularly the LUL durability and the alumina resistance (suppression of decomposition of the lubricants due to alumina).

This invention has been made in view of these conventional circumstances and has an object to provide a magnetic disk that is excellent in durability, particularly in LUL durability and alumina resistance, and thus has high reliability despite the low flying height of a magnetic head following the rapid increase in recording density in recent years and despite the very strict environmental resistance following the diversification of applications.

Means for Solving the Problem

As a result of intensive studies on the durability of a lubricant that largely affects the durability of a magnetic disk, the present inventors have found that the above-mentioned problems can be solved by the following invention, and have completed this invention.

Specifically, this invention has the following configurations.

(Configuration 1)
A magnetic disk having at least a magnetic layer, a protective layer, and a lubricating layer provided in this order over a substrate, wherein the lubricating layer contains a compound having a perfluoropolyether main chain in a structure thereof and having an aromatic group at an end of a molecule thereof.

(Configuration 2)
A magnetic disk according to the configuration 1, wherein the compound is a compound having an aromatic group and a polar group at an end of a molecule thereof.

(Configuration 3)
A magnetic disk according to the configuration 2, wherein the polar group is a hydroxyl group.

(Configuration 4)
A magnetic disk according to any one of the configurations 1 to 3, wherein a number-average molecular weight of the compound contained in the lubricating layer is in a range of 1000 to 10000.

(Configuration 5)
A magnetic disk according to any one of the configurations 1 to 4, wherein the protective layer is a carbon-based protective layer formed by a plasma CVD method.

(Configuration 6)
A magnetic disk according to any one of the configurations 1 to 5, wherein the magnetic disk is adapted to be mounted in a magnetic disk device of a load unload system.

(Configuration 7)
A method of manufacturing a magnetic disk having at least a magnetic layer, a protective layer, and a lubricating layer provided in this order over a substrate, wherein the lubricating layer is formed by forming on the protective layer a film of a lubricant containing a compound obtained by reacting 2 equivalents of a perfluoropolyether compound having a perfluoropolyether main chain in a molecule thereof and having an aromatic group and a hydroxyl group at an end of the molecule with 1 equivalent of an aliphatic compound having a structure capable of reacting with the perfluoropolyether compound.

(Configuration 8)

A method of manufacturing a magnetic disk according to the configuration 7, comprising exposing the magnetic disk to an atmosphere at 50° C. to 150° C. after forming the lubricating layer.

According to the invention of Configuration 1, the magnetic disk has at least the magnetic layer, the protective layer, and the lubricating layer provided in this order over the substrate, wherein the lubricating layer contains the compound having the perfluoropolyether main chain in its structure and having the aromatic group at the end of its molecule. Therefore, there is obtained the magnetic disk that is more excellent in properties such as alumina resistance and LUL durability than conventional and thus has high reliability despite the low flying height of a magnetic head following the rapid increase in recording density in recent years and further despite the very strict environmental resistance following the diversification of applications.

In this invention, since the lubricant contained in the lubricating layer has the aromatic group at the end of its molecule and a Lewis acid such as alumina is preferentially absorbed to the aromatic group at the molecular end, decomposition at the main chain portion of the perfluoropolyether-based lubricant due to alumina is difficult to occur and, as a result, the alumina resistance and the LUL durability that can ensure sufficient long-term reliability can be obtained.

Although a method is considered that improves the alumina resistance by adding an appropriate additive to a conventional lubricant, there is a problem that a lubricant with uniform quality is difficult to obtain in the mass production. Moreover, since the further reduction in film thickness is required, in order to form a lubricating layer (with high coverage) that can sufficiently cover the surface of a magnetic disk with a thinner thickness, it is more advantageous to improve the alumina resistance by the structure of a lubricant molecule.

According to the invention of Configuration 2, it is particularly preferable for this invention that the compound contained in the lubricating layer be the compound having the aromatic group and the polar group at the end of its molecule. By the occurrence of suitable interaction between the polar group (e.g. hydroxyl group) at the end of the lubricant molecule and the protective layer, the movement of the aromatic group at the end of the lubricant molecule is restricted so that the alumina absorbing action is enhanced and, further, since it is possible to form the lubricating layer in which the lubricant molecules adequately have a folding structure on the protective layer, even if the thickness of the lubricating layer is reduced, it is possible to sufficiently cover the surface of the protective layer and thus to uniformly form the lubricating layer at the surface of the magnetic disk.

According to the invention of Configuration 3, the hydroxyl group is particularly preferable as the polar group possessed by the compound. This is because the hydroxyl group has a large interaction with the protective layer, particularly a carbon-based protective layer, and thus can enhance the adhesion between the lubricating layer and the protective layer.

According to the invention of Configuration 4, the number-average molecular weight of the compound contained in the lubricating layer is particularly preferably in the range of 1000 to 10000. This is because it can have recoverability with proper viscosity to exhibit suitable lubrication performance and further have excellent heat resistance.

According to the invention of Configuration 5, the protective layer is particularly preferably the carbon-based protective layer formed by the plasma CVD method. This is because the carbon-based protective layer with a uniform and dense surface can be formed by the plasma CVD method, which is suitable for this invention.

According to the invention of Configuration 6, the magnetic disk of this invention is suitable as a magnetic disk adapted to be mounted in a magnetic disk device of, particularly, the LUL system. Because of the further reduction in magnetic head flying height following the introduction of the LUL system, the magnetic disk is required to stably operate even in the case of the low flying height of 10 nm or less. Therefore, the magnetic disk of this invention having high reliability even with the low flying height is suitable.

According to the invention of Configuration 7, the magnetic disk of this invention having high reliability even with the low flying height is obtained by a method of manufacturing a magnetic disk having at least a magnetic layer, a protective layer, and a lubricating layer provided in this order over a substrate, wherein the lubricating layer is formed by forming on the protective layer a film of a lubricant containing a compound obtained by reacting 2 equivalents of a perfluoropolyether compound having a perfluoropolyether main chain in a molecule thereof and having an aromatic group and a hydroxyl group at an end of the molecule with 1 equivalent of an aliphatic compound having a structure capable of reacting with the perfluoropolyether compound.

According to the invention of Configuration 8, the magnetic disk is exposed to an atmosphere at 50° C. to 150° C. after forming the lubricating layer in the magnetic disk manufacturing method of Configuration 7. This makes it possible to further improve the adhesion of the formed lubricating layer to the protective layer.

Effect of the Invention

According to this invention, it is possible to provide a magnetic disk that is excellent in durability, particularly in LUL durability and alumina resistance, and thus has high reliability despite the low flying height of a magnetic head following the rapid increase in recording density in recent years and further despite the very strict environmental resistance following the diversification of applications.

BEST MODE FOR CARRYING OUT THE INVENTION

Hereinbelow, this invention will be described in detail based on an embodiment thereof.

A magnetic disk of this invention is a magnetic disk having at least a magnetic layer, a protective layer, and a lubricating layer provided in this order over a substrate, wherein the lubricating layer contains a compound having a perfluoropolyether main chain in a structure thereof and having an aromatic group at an end of a molecule thereof.

The above-mentioned compound (hereinafter referred to as the lubricant according to this invention) contained in the lubricating layer in the magnetic disk of this invention is a compound having a perfluoropolyether main chain in its structure and having an aromatic group at an end of its molecule. As the aromatic group in this case, there is cited, for example, a phenyl group as a typical example, but alternatively, there is cited a naphthylene group, a biphenylene group, a phthalimidyl group, an aniline group, or the like. The aromatic group may have an appropriate substituent.

As described above, the lubricant according to this invention contained in the lubricating layer is, for example, a compound having an aromatic group such as, for example, a phenyl group at each of both ends of a chain molecule having a perfluoropolyether main chain in its structure, but for allowing the function and effect of this invention to be exhibited most suitably, it is preferably a compound having a polar group in its structure in addition to the aromatic group. For example, it is particularly preferably a compound having both an aromatic group and a polar group at each of both ends of a chain molecule having a perfluoropolyether main chain in its structure.

As described above, by providing the lubricating layer containing the lubricant according to this invention, the magnetic disk is excellent in durability, particularly in LUL durability and alumina resistance, even with the magnetic head ultra-low flying height of, for example, about 5 nm following the increase in recording density in recent years and with the very strict environmental resistance following the diversification of applications. Therefore, this invention is suitable for realizing a magnetic disk having high reliability (capable of ensuring stable operation) even under severe use conditions.

Exemplified compounds of the lubricants according to this invention are given below, but this invention is not limited to these compounds.

[Chemical Formula 1]

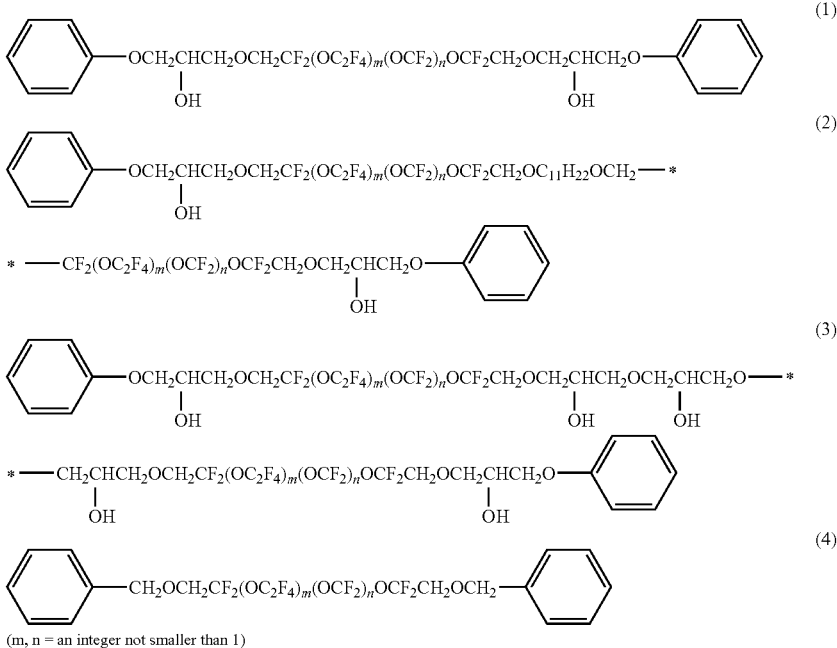

($m$, $n$ = an integer not smaller than 1)

As the polar group in this case, it needs to be a polar group that causes the occurrence of suitable interaction between the lubricant and the protective layer when the lubricant is formed into a film on the protective layer. For example, there is cited a hydroxyl group (—OH), an amino group (—$NH_2$), a carboxyl group (—COOH), an aldehyde group (—COH), a carbonyl group (—CO—), a sulfonic group (—$SO_3H$), or the like. Among them, the hydroxyl group is particularly preferable as the polar group. This is because the hydroxyl group has a large interaction with the protective layer, particularly a carbon-based protective layer, and thus can enhance the adhesion between the lubricating layer and the protective layer.

According to the lubricant according to this invention described above, since the lubricant contained in the lubricating layer has the aromatic group at the end of its molecule and a Lewis acid such as alumina is preferentially absorbed (adsorbed?) to the aromatic group at the molecular end, decomposition at the main chain portion of the perfluoropolyether-based lubricant due to alumina is difficult to occur and, as a result, the alumina resistance and the LUL durability that can ensure sufficient long-term reliability can be obtained even with an ultra-low flying height of, for example, about 5 nm.

As a method of manufacturing the lubricant according to this invention, there is preferably cited, for example, a manufacturing method of reacting 2 equivalents of, for example, a compound having an epoxy group and an aromatic group (e.g. phenyl glycidyl ether) with a perfluoropolyether compound having a perfluoropolyether main chain in a molecule thereof.

The molecular weight of the lubricant according to this invention is not particularly limited, but, for example, the number-average molecular weight (Mn) is preferably in the range of 1000 to 10000 and more preferably in the range of 1000 to 6000. This is because it can have recoverability with proper viscosity to exhibit suitable lubrication performance and further have excellent heat resistance.

Further, according to, for example, the above-mentioned manufacturing method, the lubricant according to this invention can be obtained as a lubricant with a high molecular weight and thus it is possible to suppress a reduction in molecular weight due to thermal decomposition. Therefore, when a magnetic disk is manufactured by the use of such a lubricant, it is possible to improve the heat resistance thereof. Because of the further reduction in magnetic head flying height (10 nm or less) following the increase in recording density in recent years, the possibility becomes high that contact or friction between a magnetic head and the surface of a magnetic disk frequently occurs. When the magnetic head is brought in contact with the surface of the magnetic disk, it may happen that the magnetic head does not immediately go out of contact with the surface of the magnetic disk, but slides with friction for a while. Further, because of recording/reproduction performed by the high-speed rotation of a magnetic disk in recent years, heat due to contact or friction is generated more than conventional. Therefore, it is concerned that the possibility becomes higher than conventional that a material of a lubricating layer on the surface of the magnetic disk is thermally decomposed due to the generation of such heat, so that data read/write is subjected to failure due to adhesion, to a magnetic head, of the lubricant thermally decomposed to decrease in molecular weight and increase in fluidity. Further, in consideration of data recording/reproduction in the state where a magnetic head and a magnetic disk are in contact with each other in near future, the influence of heat generation due to the constant contact is further concerned. Taking this situation into account, it is desired that heat resistance required for a lubricating layer be further improved, and thus the lubricant of this invention is suitable.

By carrying out molecular weight fractionation of the lubricant according to this invention by an appropriate method, the molecular weight dispersion (ratio of weight-average molecular weight (Mw)/number-average molecular weight (Mn)) is preferably set to 1.3 or less.

In this invention, it is not necessary to particularly limit a method for molecular weight fractionation, but, for example, use can be made of molecular weight fractionation by a gel permeation chromatography (GPC) method, molecular weight fractionation by a supercritical fluid extraction method, or the like.

When forming the lubricating layer by the use of the lubricant according to this invention, it can be formed by using a solution in which the lubricant is dispersed and dissolved in an appropriate solvent and coating the solution by, for example, a dipping method. As the solvent, use can be preferably made of, for example, a fluorine-based solvent (trade name Vertrel XF manufactured by DuPont-Mitsui Fluorochemicals Co., Ltd., or the like). A film forming method for the lubricating layer is, of course, not limited to the above-mentioned dipping method and use may be made of a film forming method such as a spin coating method, a spray method, or a paper coating method.

In this invention, in order to further improve the adhesion of the formed lubricating layer to the protective layer, the magnetic disk may be exposed to an atmosphere at 50° C. to 150° C. after the film formation.

In this invention, the thickness of the lubricating layer is preferably set to 4 to 18 Å. If it is less than 4 Å, there is a case where the lubrication performance as the lubricating layer is lowered. If it exceeds 18 Å, it is not preferable in terms of a reduction in film thickness, there is a case where the fly stiction failure occurs, and there is a case where the LUL durability is lowered.

As the protective layer in this invention, a carbon-based protective layer can be preferably used. Particularly, an amorphous carbon protective layer is preferable. With the protective layer being particularly the carbon-based protective layer, the interaction between the polar groups (particularly the hydroxyl groups) of the lubricant according to this invention and the protective layer is further enhanced so that the function and effect of this invention are further exhibited, which is thus a preferable mode. The adhesion between the carbon-based protective layer and the lubricating layer can be controlled by forming the carbon-based protective layer of hydrogenated carbon and/or nitrogenated carbon and adjusting the content of hydrogen and/or nitrogen. In this case, the content of hydrogen is preferably set to 3 to 20 at % when measured by hydrogen forward scattering (HFS). The content of nitrogen is preferably set to 4 to 12 at % when measured by X-ray photoelectron spectroscopy (XPS).

In this invention, the carbon-based protective layer does not need to contain hydrogen and/or nitrogen uniformly over its entirety and is preferably a composition gradient layer containing, particularly, nitrogen on its lubricating layer side and hydrogen on its magnetic layer side.

When using the carbon-based protective layer in this invention, it can be formed by, for example, a DC magnetron sputtering method, but it is preferably an amorphous carbon protective layer particularly formed by a plasma CVD method. Being formed by the plasma CVD method, the surface of the protective layer becomes uniform and dense. Therefore, it is preferable that the lubricating layer by this invention be formed on the protective layer with a smaller roughness formed by the CVD method.

In this invention, the thickness of the protective layer is preferably set to 20 to 70 Å. If it is less than 20 Å, there is a case where the performance as the protective layer is lowered. If it exceeds 70 Å, it is not preferable in terms of a reduction in film thickness.

In the magnetic disk of this invention, the substrate is preferably a glass substrate. The glass substrate is rigid and excellent in smoothness and thus is suitable for an increase in recording density. As the glass substrate, an aluminosilicate glass substrate, for example, is cited and, particularly, a chemically strengthened aluminosilicate glass substrate is preferable.

In this invention, the main surface of the substrate is preferably ultra-smooth with Rmax of 6 nm or less and Ra of 0.6 nm or less. The surface roughness Rmax and Ra herein referred to are based on the JIS B0601 standard.

The magnetic disk of this invention has at least the magnetic layer, the protective layer, and the lubricating layer provided over the substrate. In this invention, the magnetic layer is not particularly limited and may be an in-plane recording type magnetic layer or a perpendicular recording type magnetic layer. However, the perpendicular recording type magnetic layer is preferable for realizing the rapid increase in recording density in recent years. Particularly, if it is a CoPt-based magnetic layer, high coercive force and high reproduction output can be achieved, which is thus preferable.

In the magnetic disk of this invention, an underlayer may be provided between the substrate and the magnetic layer if necessary. Further, an adhesive layer, a soft magnetic layer, and so on may be provided between the underlayer and the substrate. In this case, as the underlayer, there is cited, for example, a Cr layer, a Ta layer, a Ru layer, a CrMo, CoW, CrW, CrV, or CrTi alloy layer, or the like and, as the adhesive layer, there is cited, for example, a CrTi, NiAl, or AlRu alloy layer or the like. Further, as the soft magnetic layer, there is cited, for example, a CoZrTa alloy film or the like.

The magnetic disk of this invention is suitable as a magnetic disk adapted to be mounted in a magnetic disk device of, particularly, the LUL system. Because of the further reduction in magnetic head flying height following the introduction of the LUL system, the magnetic disk is required to stably operate even in the case of a low flying height of 10 nm or less. Therefore, the magnetic disk of this invention having high reliability even with the low flying height is suitable.

Example

Hereinbelow, this invention will be described in further detail with reference to an Example.

Example 1

FIG. 1 shows a magnetic disk 10 according to one Example of this invention.

The magnetic disk 10 has an adhesive layer 2, a soft magnetic layer 3, a first underlayer 4, a second underlayer 5, a magnetic layer 6, a carbon-based protective layer 7, and a lubricating layer 8 which are formed in this order on a substrate 1.

(Manufacture of Lubricant)

The above-exemplified lubricant compound (2) was manufactured in the following manner.

It was manufactured by reacting a perfluoropolyether compound having a perfluoropolyether main chain in a molecule thereof with 2 equivalents of a base and then with 2 equivalents of glycidyl phenyl ether.

A lubricant comprising the compound thus obtained was properly subjected to molecular weight fractionation by the supercritical fluid extraction method.

(Manufacture of Magnetic Disk)

A 2.5-inch glass disk (outer diameter 65 mm, inner diameter 20 mm, disk thickness 0.635 mm) made of a chemically strengthened aluminosilicate glass was prepared as the disk substrate 1. The main surface of the disk substrate 1 was mirror-polished to Rmax of 2.13 nm and Ra of 0.20 nm.

On the disk substrate 1, the Ti-based adhesive layer 2, the Fe-based soft magnetic layer 3, the first underlayer 4 of NiW, the second underlayer 5 of Ru, and the magnetic layer 6 of CoCrPt were formed in this order in an Ar gas atmosphere by the DC magnetron sputtering method. This magnetic layer was a perpendicular magnetic recording type magnetic layer.

Subsequently, the diamond-like carbon protective layer 7 was formed to a thickness of 50 Å by the plasma CVD method.

Then, the lubricating layer 8 was formed in the following manner.

There was prepared a solution in which a lubricant (Mn measured by the NMR method was 2000 and the molecular weight dispersion was 1.25) comprising the lubricant (the above-exemplified compound (2)) of this invention manufactured as described above and subjected to the molecular weight fractionation by the supercritical fluid extraction method was dispersed and dissolved in a fluorine-based solvent, Vertrel XF (trade name) manufactured by DuPont-Mitsui Fluorochemicals Co., Ltd., at a concentration of 0.2 wt %. Using this solution as a coating solution, a magnetic disk formed with the layers up to the protective layer 7 was immersed therein and coated therewith by the dipping method, thereby forming the lubricating layer 8.

After the film formation, the magnetic disk was heat-treated in a vacuum furnace at 130° C. for 90 minutes. The thickness of the lubricating layer 8 was measured by a Fourier transform infrared spectrophotometer (FTIR) and it was 12 Å. In this manner, the magnetic disk 10 of Example 1 was obtained.

Then, the lubricant and the magnetic disk of Example 1 were evaluated by the following test methods.

(1) First, an alumina resistance evaluation test was performed for the lubricant used in Example 1.

The lubricant was added with 20% alumina ($Al_2O_3$) and maintained in a nitrogen gas ($N_2$) atmosphere at a constant temperature of 200° C. for 500 minutes, thereby performing a thermogravimetric analysis.

As a result, it was seen that the lubricant according to this invention used in Example 1 exhibited a damping factor of 15% or less when alumina was added, and thus was excellent in alumina resistance, i.e. decomposition due to alumina was hard to occur.

(2) Then, a LUL (Load Unload) durability test was performed for evaluating the LUL durability of the magnetic disk.

A LUL-system HDD (5400 rpm rotation type) was prepared and a magnetic head with a flying height of 5 nm and the magnetic disk of the Example were mounted therein. A slider of the magnetic head was a NPAB (negative pressure) slider and was mounted with a magnetoresistive effect element (GMR element) as a reproducing element. A shield portion was made of a FeNi-based permalloy alloy. By causing the LUL-system HDD to continuously repeat the LUL operations, the number of LUL times endured by the magnetic disk up to the occurrence of failure was measured.

As a result, the magnetic disk of Example 1 endured the LUL operations of 900,000 times with no failure at an ultra-low flying height of 5 nm. In a normal HDD using environment, use for about 10 years is generally required for the number of LUL times to exceed 400,000 times. Since a magnetic disk is currently judged to be preferable if it endures 600,000 times or more, it can be said that the magnetic disk of Example 1 has very high reliability.

The surface of the magnetic disk after the LUL durability test was observed in detail using an optical microscope and an electron microscope and was found to be excellent, i.e. no abnormality such as damage or dirt was observed. Further, the surface of the magnetic head after the LUL durability test was observed in detail using an optical microscope and an electron microscope and was found to be excellent, i.e. no abnormality such as damage or dirt was observed and, further, no lubricant adhesion to the magnetic head or no corrosion failure was observed.

For evaluating the thermal properties, the LUL durability test was performed in atmospheres of −20° C. to 50° C. With the magnetic disk of this Example, no particular failure occurred and the good results were obtained.

Comparative Example

As a lubricant, use was made of a conventional perfluoropolyether-based lubricant, Fomblin Z-DOL (trade name) manufactured by Solvay Solexis, Inc., having been subjected to molecular weight fractionation by the GPC method to have Mw of 2000 and a molecular weight dispersion of 1.08. Then, a solution in which this lubricant was dispersed and dissolved in a fluorine-based solvent, Vertrel XF (trade name) manufactured by DuPont-Mitsui Fluorochemicals Co., Ltd., was used as a coating solution and a magnetic disk formed with layers up to a protective layer was immersed therein and coated therewith by the dipping method, thereby forming a lubricating layer. Herein, the concentration of the coating solution was properly adjusted so that the lubricating layer was formed to a thickness in the range of 10 to 12 Å. A magnetic disk was manufactured in the same manner as in Example 1 except the above-mentioned point and was used as a Comparative Example.

Then, an alumina resistance evaluation test was performed for the lubricant of Comparative Example in the same manner as in Example 1 and, as a result, the damping factor was as large as 80%. That is, with respect to the conventional lubricant described above, decomposition due to alumina tends to occur and thus the possibility of a reduction in molecular weight is high.

Further, a LUL durability test was performed in the same manner as in the Example and, as a result, the magnetic disk of this Comparative Example failed at 400,000 times with an ultra-low flying height of 5 nm. The surface of the magnetic disk after the LUL durability test was observed in detail using an optical microscope and an electron microscope and, as a result, damage or the like was slightly observed. Further, the surface of a magnetic head after the LUL durability test was observed in detail using an optical microscope and an electron microscope and, as a result, lubricant adhesion to the magnetic head and corrosion failure were observed.

BRIEF DESCRIPTION OF THE DRAWINGS

FIG. 1 is an exemplary cross-sectional view of a magnetic disk according to one Example of this invention.

DESCRIPTION OF SYMBOLS 1 substrate
2 adhesive layer
3 soft magnetic layer
4 first underlayer
5 second underlayer
6 magnetic layer
7 carbon-based protective layer
8 lubricating layer
10 magnetic disk

The invention claimed is:

1. A magnetic disk having at least a magnetic layer, a protective layer, and a lubricating layer provided in this order over a substrate,
wherein said lubricating layer contains, as lubricant, only a compound consisting of a perfluoropolyether main chain in a structure thereof and an aromatic group and a polar group at each of both ends of a molecule thereof,
wherein said aromatic group is a phthalimidyl group, and
wherein said polar group is selected from the group consisting of an aldehyde group and a sulfonic group.

2. A magnetic disk according to claim 1, wherein a number-average molecular weight of said compound contained in said lubricating layer is in a range of 1000 to 10000.

3. A magnetic disk according to claim 1, wherein said protective layer is a carbon-based protective layer formed by a plasma CVD method.

4. A magnetic disk according to claim 1, wherein said magnetic disk is adapted to be mounted in a magnetic disk device of a load unload system.

5. A method of manufacturing a magnetic disk having at least a magnetic layer, a protective layer, and a lubricating layer provided in this order over a substrate,
wherein said lubricating layer is formed by forming on said protective layer a film of a lubricant containing a compound obtained by reacting 2 equivalents of a perfluoropolyether compound having a perfluoropolyether main chain in a molecule thereof and having an aromatic group and a hydroxyl group at an end of the molecule with 1 equivalent of an aliphatic compound having a structure capable of reacting with the perfluoropolyether compound,
wherein said lubricating layer contains, as lubricant, only a compound consisting of a perfluoropolyether main chain in a structure thereof and an aromatic group and a polar group at each of both ends of a molecule thereof,
wherein said aromatic group is a phthalimidyl group, and
wherein said polar group is selected from the group consisting of an aldehyde group and a sulfonic group.

6. A method of manufacturing a magnetic disk according to claim 5, comprising exposing said magnetic disk to an atmosphere at 50° C. to 150° C. after forming said lubricating layer.

* * * * *